Figure 1:
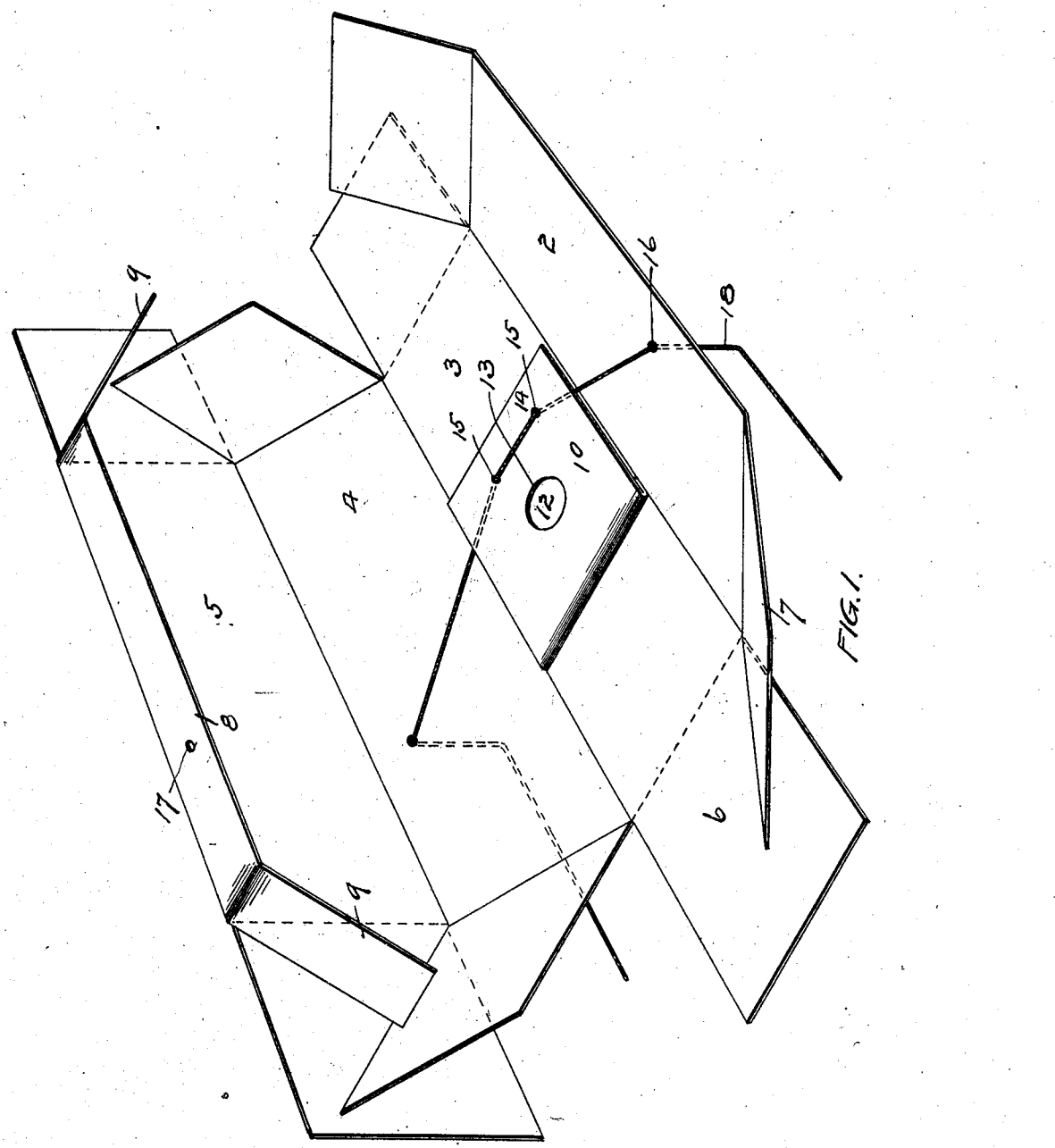

No. 760,886. PATENTED MAY 24, 1904.
L. P. LORD.
BOX FOR TRANSPORTING POTTED PLANTS.
APPLICATION FILED AUG. 18, 1903.
NO MODEL. 2 SHEETS—SHEET 1.

WITNESSES
INVENTOR
LEWIS P. LORD
BY
Paul & Paul
HIS ATTORNEYS

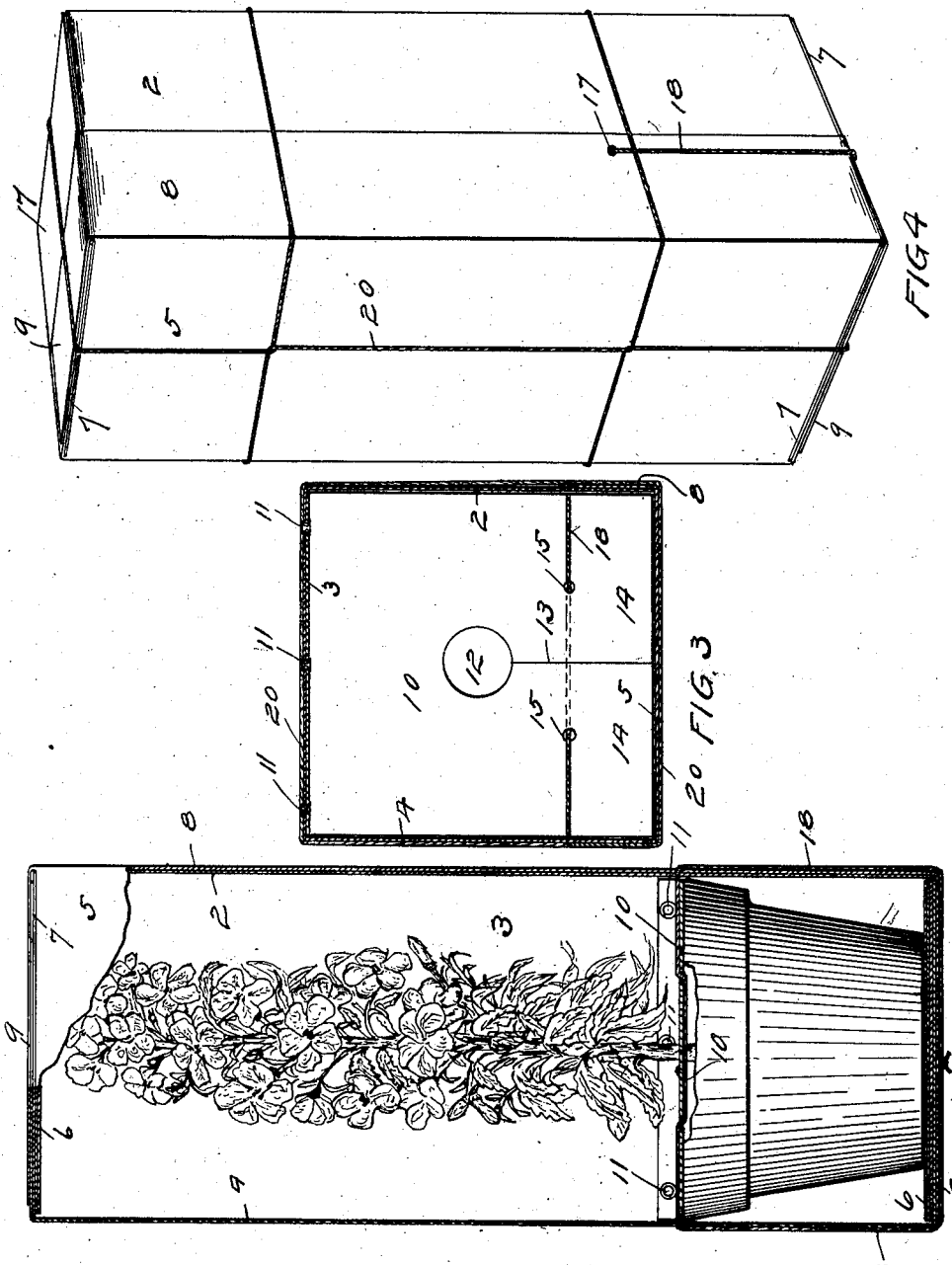

No. 760,886. Patented May 24, 1904.

UNITED STATES PATENT OFFICE.

LEWIS P. LORD, OF OWATONNA, MINNESOTA.

BOX FOR TRANSPORTING POTTED PLANTS.

SPECIFICATION forming part of Letters Patent No. 760,886, dated May 24, 1904.

Application filed August 18, 1903. Serial No. 169,860. (No model.)

*To all whom it may concern:*

Be it known that I, LEWIS P. LORD, of Owatonna, county of Steele, State of Minnesota, have invented certain new and useful Improvements in Boxes for Transporting Potted Plants, of which the following is a specification.

In delivering or shipping potted plants it has been customary to wrap them in paper to protect the leaves and blossoms from dirt and injury, and in making shipments from place to place, as by express, wooden boxes are sometimes provided wherein the pots are packed. The time consumed in wrapping or packing the plants in addition to the cost of material increases considerably the expense of handling them.

The object, therefore, of my invention is to provide a box or package wherein a potted plant can be easily and quickly packed.

A further object is to provide a box which with the plant therein can be easily carried from place to place in the hand.

A further object is to provide a box which will permit inspection of its contents at any time.

A still further and particular object is to provide a box having means for preventing the escape of dirt from the pot and holding the pot in place and bracing the stalk of the plant. Other objects of the invention will appear from the following detailed description.

In the accompanying drawings, forming part of this specification, Figure 1 is a perspective of an open box embodying my invention. Fig. 2 is a vertical section of the same in its closed position. Fig. 3 is a horizontal section, and Fig. 4 is a perspective view, showing the box tied and ready for shipment.

In the drawings, 2, 3, 4, and 5 represent the side walls of the box, preferably made in one piece of straw or cellular board or any other suitable material. These walls are scored or creased at the corners in the usual way employed in making collapsible flexible boxes, and the side wall 3 is provided with a bottom 6, over which the ends 7 of the other sides are folded when the box is set up. These ends, with the bottom, form a substantial springy support whereon the pot is placed, there being sufficient yield or "give" to the overlapped ends to prevent undue jar on the pot and its contents. A side wall 5 is provided with a flap 8 on its vertical edge, that is adapted when the box is set up to fold around the corner in the manner shown in Fig. 4, and this flap is provided with folding ends 9, that are arranged to overlap the ends of the box. At the top the walls of the box are provided with folding ends similar to the ends 7 and adapted to be bent down over one another and close the top of the box, but permit the ready inspection of its contents whenever desired.

The wall 3 is provided near the middle thereof with a folding shelf or flap member 10, secured at one edge to the side wall by suitable fastening devices, as the eyelets 11, and having a centrally-arranged hole 12, from which a slit 13 extends to the edge of the flap, forming on the side of the flap opposite said hinge 2 flexible wing-like members 14, which upon being separated permit communication with the hole 12. Each of the wings 14 is provided with a hole 15, opposite which in the walls 2 and 4 are corresponding holes 16, and I prefer, also, to provide a hole 17 in the flap 8, arranged substantially opposite the others. A cord 18 is threaded through these holes, extending beneath the wings 14 and up through the holes 15 and down around the edges of the flap 10. (See Fig. 2.) This cord is attached at any suitable point to the walls of the box and forms a part of it and is at hand to be tied when the box is filled and folded.

The manner of using my invention is as follows: A plant having been sold to a customer, the sides of a box are brought together and the pot placed therein, resting upon the bottom 6 and the folded ends 7. The hinged flap 10 is then swung down and the wings 14 separated sufficiently to allow the stalk of the plant to slip into the hole 12, whereupon the wings will return to their normal position and prevent the stalk from slipping out of the hole. The flap is arranged to cover the top of the pot when swung down over the same, and when the cord 18 is passed under the bottom of the box and tied it will draw down the edges of the flap 10 over the top of the pot and prevent the dirt from escaping, even though the pot should be tilted or even turned upside down, and in the latter case the cord will aid in holding the pot in position in the end of the box. The flexible flap 10 and the cord 18 therefore perform two functions. They prevent the dirt from escaping from the pot and also hold the pot in place. In the drawings I have shown the flap 10 at the proper height on the wall to fold down over the top of the pot 19, arranged within the box; but it will be understood that boxes of different size will be provided for different heights of plants, and the flap 10 will be secured at different heights on the wall of the box to adapt it for use with different-sized pots. The flap 8, as shown in Fig. 4, extends to the middle of the side wall and is held in place by the cord 18, passing through the hole 17, and this cord, while securing the box and holding the pot firm therein, will permit the inspection of the plant through the folding upper ends, which may be readily turned back to expose the plant. To carry the box in the hand or ship it from place to place, a second cord 20 is preferably placed thereon, adapted to pass around the ends and the side walls and draw them together.

With a device of this kind a florist can easily and quickly prepare a plant for local delivery or shipment to a distance.

I claim as my invention—

1. As a new article of manufacture, a folding oblong box of flexible material having collapsible side and end walls arranged when folded to inclose potted plants placed lengthwise therein resting upon one end of the box, and a part intermediate to the ends of said box having a hole to receive the stalk of the plant and adapted to rest upon the top of the pot, and a cord passing through said part and over its edges and through said walls, substantially as described.

2. As a new article of manufacture, a folding box for potted plants, comprising collapsible side and end walls, a member having a hole and a slit leading from said hole to the edge of said member, and means for securing said member on the top of a pot, substantially as described.

3. The combination, with a box, of a member having a centrally-arranged hole therein, and a slit leading from said hole to the edge of said member, and a cord passing through holes upon each side of said slit on the under side of the same and over the edges of said member and through said walls, substantially as described.

4. In a folding box, the combination, with a side wall having a folded end, of corresponding side walls also having folding ends to overlap said first-named end and adapted to receive a flower-pot placed thereon, a flap hinged to said side wall above said end and having a hole to receive the stalk of a plant, and a cord passing through said flap and said walls, for the purpose specified.

5. In a folding box, the combination, with a side wall having folding ends, of corresponding walls integral therewith having folded ends adapted to lap over said first-named ends, two of said walls having eyelet-holes near the middle thereof, a flap provided on one of said side walls having folding ends and provided with an eyelet-hole, a member hinged to said first-named side wall near the middle thereof and having a centrally-arranged hole and a slit leading from said hole to the edge of said member, said member having eyelet-holes upon each side of said slit, and a cord threaded in said holes, substantially as described.

6. As a new article of manufacture, a folding oblong box substantially square in cross-section, having collapsible side and end walls arranged when folded to inclose a potted plant placed lengthwise therein upon one end of the box, a part hinged to the wall of said box intermediate to its ends and adapted to rest upon the top of the flower-pot, and means for securing said pot between said hinged part and said end, substantially as described.

In witness whereof I have hereunto set my hand this 12th day of August, 1903.

LEWIS P. LORD.

In presence of—
W. A. SPERRY,
C. E. HAYDON.